United States Patent Office 3,128,236
Patented Apr. 7, 1964

3,128,236
PROCESS FOR PREPARING BETA-CAROTENE
James E. Zajic, Oklahoma City, Okla., assignor to Grain Processing Corporation, Muscatine, Iowa, a corporation of Iowa
No Drawing. Filed Nov. 21, 1961, Ser. No. 154,035
11 Claims. (Cl. 195—28)

This invention relates to a fermentation process and has for an object the provision of a process for producing beta-carotene by a fermentation method.

It is known that beta-carotene may be synthesized by certain microorganisms in aqueous nutrient media. Microorganisms that have been found to be suitable for this purpose are species within the genus Choanephora (formerly Blakeslea) of the order Mucorales. Each species of fungi belonging to the order Mucorales can be divided into two groups based upon their sexual reaction. Thus, strains exist of opposite mating types which may be regarded as similar to the male and female sexes of higher plants or animals. Under specific conditions of temperature, nutrients, moisture, aeration, pH and so forth, the plus (male) strain and the minus (female) strain produce unknown complementary hormones which initiate the formation of a sexual body called a zygospore. Beta-carotene production is associated with this sexual process. Accordingly, beta-carotene has been produced in the art by cultivating in an aqueous nutrient medium substantially equal proportions of opposite mating types of these organisms. However, with the use of substantially equal proportions of each mating type of the Choanephora organisms, the yield of beta-carotene is widely and unpredictably variable with disappointingly small yields often being obtained.

It has now been found unexpectedly that the yield of beta-carotene can be significantly increased by cultivating in aqueous nutrient media unequal proportions of plus and minus strains of the Choanephora organisms. In certain instances a greater proportion of the plus strain of the Choanephora organisms are employed in the fermentation process while in other instances the minus strain of the organisms is in preponderance. It does not appear that the proportion of each mating type to be employed is particularly critical as long as the ratio is appreciably greater than 1:1 with the proper mating type of the organisms being employed in the greater proportion. In general, ratios from about 1.2:1 up to about 20:1 or more on a dry weight basis have been found suitable. Maximum yield of beta-carotene can be consistently obtained by using an optimum unbalanced ratio of opposite mating types of the Choanephora organisms. The mating type of organism which should be in preponderance, as well as the optimum ratio of the two mating types, can be readily determined by experimentation for any particular combination of organisms.

The microorganisms which are employed in the present invention are the beta-carotene producing strains of the genus Choanephora and include, for example, *Choanephora cucurbitarum*, *Choanephora simsoni*, *Choanephora infundibulifera*, *Choanephora manshurica*, *Choanephora conjuncta* and *Choanephora circinans*. A preferred species is *Choanephora trispora*. These organisms are aerobic in nature and correspondingly the fermentation is carried out under aerobic conditions which may be provided by agitation or aeration of the medium during the incubation period. Plus and minus strains of the same species can be used in the present invention as well as opposite mating types of different species. For example, a strain of *Choanephora trispora* having a plus reaction can be combined with a strain of *Choanephora circinans* having a minus reaction.

If the sexual activity of the organisms to be employed is not known, this can be determined prior to use by inoculating each strain of organism on a nutrient agar such as potato-dextrose agar in the same Petri-dish under appropriate culture conditions at a temperature of about 20 to 30° C. If the organisms tested are of the same mating type, colonies will grow on the plate and meet but nothing further will occur. If, however, they are of opposite mating types, the colonies will meet and typical sexually-produced zygospore cells will be formed. Once strains have been mated and their mating reaction identified, they can then be used in the fermentation process of the present invention.

The nutrient medium employed in the present invention is of the conventional type known to be useful for the cultivation of the Choanephora microorganisms and will generally contain a source of carbohydrate, a nitrogen source such as a protein, a vegetable oil and usually a source of minerals. In addition, vitamin and mineral acids may be added if desired. Thus the medium should include a carbohydrate such as starch or starch-containing materials, such as milo, rye, red dog, cornstarch or the like. Also other carbohydrates, such as dextrin, glucose or other fermentable sugars, may be used. It is preferred that the amount of carbohydrate in the fermentation medium range between about ½ and 4 percent by weight. With respect to the nitrogen source, any proteinaceous material may be satisfactory for this purpose, such as distillers' solubles, acid hydrolyzed corn, cottonseed meal, soy flour, corn gluten meal and the like. The amount of proteinaceous material in the fermentation medium may be varied, but suitably it is within the range of from about 4 to 12 percent by weight.

It is known that vegetable oils are useful for promoting the growth of these organisms and, accordingly, it is preferred that vegetable oils in the amount of from 0.5 to 4.5 percent by weight be included in the medium. Suitable vegetable oils are soy bean oil, corn oil, castor bean oil, rapeseed oil, sesame oil, rice oil, mustard seed oil, olive oil, linseed oil, peanut oil or other glycerides of vegetable origin.

The optimum and preferred pH for the medium is between about 5.5 and 7.5, while the preferred temperature of incubation is between about 22° and 32° C. Ordinarily the fermentation will be complete and may be harvested in from 3 to 12 days. However, six days is usually satisfactory.

It will also be appreciated that other growth-promoting substances or supplements may be added to the medium in addition to those specifically indicated above, such as minerals, vitamins, trace elements, amino acids and the like, and these supplemental additives include leucine, isoleucine, histidine, methionine, thiamine, ascorbic acid, di- or mono-basic potassium phosphate, ammonium carbonate, magnesium sulfate, etc.

A greater appreciation of the invention and its advantages will be obtained from the following specific examples which are merely illustrative in nature and are not limitative of the invention.

EXAMPLE I

A basal aqueous fermentation medium was prepared containing 8.5 percent distillers solubles, 3.0 percent soybean oil, 1.5 percent corn oil, 5 percent nontoxic kerosene hydrocarbon fraction, 0.001 percent thiamine, 0.05 percent propenyl methyl guaethol (antioxidant), 0.03 percent non-ionic surfactant, 1 percent starch. After incubation for approximately 48 hours 0.1 percent beta-ionone was also incorporated in the medium. This medium was sterilized in the usual manner and cooled to about 25° C. It had a pH of about 6.3. The inoculum was then prepared by cultivating opposite mating types of *Choanephora trispora* separately on a liquid dextrosecarboxymethyl cellulose-phytone medium at 28° C. for 48 hours. The strains of *Choanephora trispora* utilized were NRRL A–9216 which is a plus strain and NRRL A–9159 which is a minus strain.

In order to demonstrate the effectiveness of using a controlled inoculum ratio of the different mating types of the organisms, a series of experiments were carried out. In each of these experiments 100 milliliters of the above aqueous basal fermentation medium were placed in 500 milliliter Erlenmeyer flasks and sterilized in an autoclave. After autoclaving the pH was about 6.2. Controlled levels and ratios of inocula of the two mating types of *Choanephora trispora* were measured and used for inoculation of the fermentation medium. The optimum ratio of inocula was determined both on a liquid-volume and dry weight basis. The inoculated flasks were incubated at 28° C. on a conventional rotary shaker at 200 r.p.m. The fermentations were carried out for 6 days. After the fermentations were completed the cellular mass was homogenized and the excess moisture removed by suction filtration. An aliquot of wet or oven dried mycelium was removed, the carotenoids extracted quantitatively with acetone and a determination of beta-carotene completed by comprising the absorption at 450 millimicrons to that of a standard sample of beta-carotene.

EXAMPLE II

Utilizing the same basal fermentation medium and procedure as above, an experiment was conducted wherein the total liquid-volume of inoculum was held constant at 10 percent while the ratio of inoculum of strains NRRL A–9216 (+) and NRRL A–9159 (−) *Choanephora trispora* was varied over a range of 10:0 in favor of each strain. The effect of varying the ratio of the inocula mixture of the plus and minus strains is shown in Table I.

*Table I.—Percent Inoculum* Choanephora trispora

| Based on Liquid-Volume | | Ratio [1] | Based on Dry Weight Mycelium | | Ratio [1] | Beta-Carotene, mg./100 ml., Medium |
| --- | --- | --- | --- | --- | --- | --- |
| A–9216+ | A–9159− | | A–9216 | A–9159 | | |
| 10 | 0 | ----- | .100 | 0 | ----- | 3.86 |
| 9.0 | 1.0 | 9.0:1.0 | .090 | .011 | 8.2:1.0 | 25.1 |
| 8.0 | 2.0 | 4.0:1.0 | .080 | .022 | 3.6:1.0 | 30.3 |
| 7.0 | 3.0 | 2.3:1.0 | .070 | .033 | 2.1:1.0 | 44.0 |
| 6.0 | 4.0 | 1.5:1.0 | .060 | .044 | 1.4:1.0 | 49.9 |
| 5.0 | 5.0 | 1.0:1.0 | .050 | .055 | 1.0:1.1 | 54.8 |
| 4.5 | 5.5 | 1.0:1.2 | .045 | .061 | 1.0:1.4 | 68.0 |
| 4.0 | 6.0 | 1.0:1.5 | .070 | .066 | 1.0:1.6 | 76.0 |
| 3.0 | 7.0 | 1.0:2.3 | .030 | .077 | 1.0:2.6 | 91.0 |
| 2.0 | 8.0 | 1.0:4.0 | .020 | .088 | 1.0:4.4 | 89.6 |
| 1.0 | 9.0 | 1.0:9.0 | .010 | .099 | 1.0:9.9 | 77.7 |
| 0.5 | 9.5 | 1.0:19 | .005 | .104 | 1.0:21 | 64.0 |
| 0 | 10 | ----- | 0 | .110 | ----- | 4.13 |

[1] Ratio calculated by reducing or expanding the proportion of the inoculum mixture to where the organism added in the least amount is equal to unity.

The importance with respect to beta-carotene production of using unequal proportions of opposite mating type organisms in a mixed or heterothallic culture is readily apparent from the foregoing data. As seen, a 10 percent inoculum of either strain added alone did not yield more than about 4.13 milligrams of beta-carotene per 100 milliliters of culture medium. The above data also shows that within specified limits an increase in beta-carotene yield was obtained by decreasing the percent of strain NRRL A–9216 and increasing the percent of strain NRRL A–9159 of *Choanephora trispora* in the inoculum mixture. A direct increase in beta-carotene yield resulted by increasing the percent of strain NRRL A–9159 from 0 to 8 percent. That is, when the liquid-volume ratio or percent inoclulum of strain NRRL A–9159:NRRL A–9216 was increased to 6:4, 7:3, 8:2 or 9:1 the yield of beta-carotene was significantly increased. The data also shows that an equal ratio (1:1), in this instance a 5 percent liquid-volume inoculum of each mating type, gave only a yield of 54.8 milligrams per 100 milliliters of culture medium. The optimum ratio of NRRL A–9159 to NRRL A–9216 calculated on a dry weight basis was about 2.6:1.

EXAMPLE III

Various inocula media were prepared and employed in accordance with the invention. A 2.0 percent inoculum of strains NRRL A–9216 and NRRL A–9159 was inoculated into separate 500 milliliter Erlenmeyer flasks containing 100 milliliters of the following 6 types of liquid aqueous inoculum media:

LIQUID AQUEOUS (INOCULA MEDIA)

(1)

| | Percent |
| --- | --- |
| Dried distillers' solubles | 8.5 |
| Soy oil | 3.0 |
| Carboxymethylcellulose | 0.5 | pH 6.2.

(2)

| | |
| --- | --- |
| Corn steep liquor (50.0% solids) | 1.0 |
| Soy oil | 3.0 |
| Carboxymethylcellulose | 0.8 | pH 6.2.

(3)

| | |
| --- | --- |
| Malt extract | 1.0 |
| Yeast extract | 1.0 |
| Dextrose | 2.0 |
| Carboxymethylcellulose | 0.8 | pH 6.2.

(4)

| | |
| --- | --- |
| Enzymatic soybean hydrolysate | 2.0 |
| Dextrose | 2.0 |
| Carboxymethylcellulose | 0.8 | pH 6.2.

(5)

| | |
| --- | --- |
| Dried distillers' solubles | 8.5 |
| Soy oil | 3.0 |
| Corn oil | 1.5 |
| Deobase | 5.0 |
| Starch | 1.0 |
| Propenyl methyl guaethol | .05 |
| Surfactant | .03 | pH 6.2.

(6)

| | |
| --- | --- |
| Phytone (soy bean hydrolysate) | 0.1 |
| Yeast extract | 0.3 |
| Malt extract | 0.2 |
| Dextrose | 2.0 |
| Carboxymethylcellulose | 0.8 |
| Agar | 0.2 |
| Surfactant | 0.03 | pH 6.2.

During inoculum development both strains of *Choanephora trispora* were cultivated separately. Inocula were incubated at 28° C. on a reciprocal type shaker reciprocating at 90 cycles per minute. After 48 hours incubation, inoculum of strains A–9216 and A–9159 was removed from each test inoculum medium and inoculation made into the fermentation basal. Using liquid-volume measurements, two ratios of inoculum of strains A–9216 and A–9159 of *Choanephora trispora* were tested for each inoculum test medium, these were respectively 5.0 percent A–9216:5.0 percent A–9159 (1.0:1.0) and 2.0 percent A–9216:8.0 percent A–9159 (1.0:4.0). The cultivation and processing procedures were the same as those previously described except the incubation period terminated at 5 days instead of six.

The effect of varied inocula media on beta-carotene synthesis when inoculated mixtures of strains NRRL A–9216 and NRRL A–9159 of *Choanephora trispora* were tested respectively at levels 5.0 percent:5.0 percent and 2.0 percent:8.0 percent are shown in Table II.

Table II

| Type Inoculum Medium | Percent Inoculum *Choanephora trispora* | | | | | Ratio[1] | beta-Carotene, mg./100 ml., Medium |
|---|---|---|---|---|---|---|---|
| | Based on Liquid-Volume | | Ratio[1] | Based on Dry Weight Mycelium | | | |
| | A-9216 | A-9159 | | A-9216 | A-9159 | | |
| Medium 1 | 5.0 | 5.0 | 1.0:1.0 | .140 | .164 | 1.0:1.18 | 57.5 |
|  | 2.0 | 8.0 | 1.0:4.0 | .070 | .328 | 1.0:4.68 | 75.2 |
| Medium 2 | 5.0 | 5.0 | 1.0:1.0 | .047 | .050 | 1.00:1.06 | 56.4 |
|  | 2.0 | 8.0 | 1.0:4.0 | .024 | .098 | 1.00:4.08 | 67.6 |
| Medium 3 | 5.0 | 5.0 | 1.0:1.0 | .038 | .056 | 1.00:1.47 | 44.2 |
|  | 2.0 | 8.0 | 1.0:4.0 | .019 | .113 | 1.00:5.96 | 64.1 |
| Medium 4 | 5.0 | 5.0 | 1.0:1.0 | .019 | .014 | 1.36:1.00 | 18.1 |
|  | 2.0 | 8.0 | 1.0:4.0 | .0094 | .028 | 1.00:2.98 | 54.5 |
| Medium 5 | 5.0 | 5.0 | 1.0:1.0 | .163 | .156 | 1.04:1.00 | 65.0 |
|  | 2.0 | 8.0 | 1.0:4.0 | .082 | .311 | 1.00:3.80 | 75.5 |
| Medium 6 | 5.0 | 5.0 | 1.0:1.0 | .047 | .050 | 1.00:1.06 | 32.7 |
|  | 2.0 | 8.0 | 1.0:4.0 | .023 | .100 | 1.00:4.35 | 77.9 |

[1] Ratio reduced or expanded until the smallest amount of inoculum added equals unity.

Data in Table II shows that for all six types of inocula media the highest yields of beta-carotene were obtained with the use of unequal proportions of the opposite mating type organisms.

EXAMPLE IV

Heterothallic strains NRRL A-9216 and NRRL 2457 of *Choanephora trispora* were paired in varying proportions utilizing the basal fermentation medium and cultivation procedure as in Example I. The results obtained were as follows:

Table III

| Liquid-Volume Inoculum | | | Dry Weight Mycelium | | | beta-carotene mg./100 ml., Medium |
|---|---|---|---|---|---|---|
| Percent Plus | Percent Minus | Ratio[1] | Percent Plus | Percent Minus | Ratio[1] | |
| 8.0 A-9216 | 2.0 2457 | 4.0:1.0 | .140 | .030 | 4.7:1.0 | 21.4 |
| 7.0 A-9216 | 3.0 2457 | 2.3:1.0 | .122 | .045 | 2.7:1.0 | 22.8 |
| 5.0 A-9216 | 5.0 2457 | 1.0:1.0 | .088 | .075 | 1.2:1.0 | 31.0 |
| 3.0 A-9216 | 7.0 2457 | 1.0:2.3 | .053 | .105 | 1.0:2.0 | 50.4 |
| 2.0 A-9216 | 8.0 2457 | 1.0:4.0 | .035 | .120 | 1.0:3.4 | 67.7 |

[1] Ratio calculated by reducing or expanding the proportion until the strain added in the lowest amount equals unity.

As will be noted, with the above combination a greater proportion of NRRL 2457 or minus strain is required to significantly increase the production of beta-carotene.

EXAMPLE V

Heterothallic strains NRRL 1348 and NRRL A-9159 of *Choanephora trispora* were paired in varying proportions utilizing the basal fermentation medium and cultivation procedure as in Example I. The results obtained are shown below.

Table IV

| Liquid-Volume Inoculum | | | Dry Weight Mycelium | | | Beta-Carotene, mg./100 ml., Medium |
|---|---|---|---|---|---|---|
| Percent Plus | Percent Minus | Ratio[1] | Percent Plus | Percent Minus | Ratio[1] | |
| 10.0 1348 | 0 A-9159 | | .160 | 0 | | 2.96 |
| 9.0 1348 | 1.0 A-9159 | 9.0:1.0 | .144 | .0132 | 10.9:1.0 | 50.3 |
| 8.5 1348 | 1.5 A-9159 | 5.7:1.0 | .136 | .0198 | 6.9:1.0 | 100 |
| 8.0 1348 | 2.0 A-9159 | 4.0:1.0 | .128 | .0264 | 4.9:1.0 | 88.6 |
| 7.5 1348 | 2.5 A-9159 | 3.0:1.0 | .120 | .0330 | 3.6:1.0 | 72.4 |
| 7.0 1348 | 3.0 A-9159 | 2.3:1.0 | .114 | .0396 | 3.9:1.0 | 66.6 |
| 6.0 1348 | 4.0 A-9159 | 1.5:1.0 | .096 | .0528 | 1.8:1.0 | 57.7 |
| 5.0 1348 | 5.0 A-9159 | 1.0:1.0 | .080 | .0660 | 1.2:1.0 | 52.8 |
| 4.0 1348 | 6.0 A-9159 | 1.0:1.5 | .064 | .0782 | 1.0:1.2 | 39.2 |
| 3.0 1348 | 7.0 A-9159 | 1.0:2.3 | .048 | .0924 | 1.0:1.9 | 37.2 |
| 2.0 1348 | 8.0 A-9159 | 1.0:4.0 | .032 | .106 | 1.0:3.3 | 37.8 |
| 1.0 1348 | 9.0 A-9159 | 1.0:9.0 | .016 | .119 | 1.0:7.4 | 36.8 |
| 0 1348 | 10.0 A-9159 | | 0 | .132 | | 2.09 |

[1] Ratio calculated by reducing or expanding the proportion until the strain added in the lowest amount equals unity.

With the above combination a greater proportion of the plus strain of organism is required to increase beta-carotene production.

EXAMPLE VI

Additional heterothallic cultures of plus and minus mating type organisms were paired in varying combinations with significant improvement in carotenoid production as shown below. The same basal fermentation and cultivation procedure as previously described were employed in all cases. The results obtained were as follows:

Table V
PERCENT INOCULUM OF *CHOANEPHORA TRISPORA* NRRL STRAINS

| Based on Liquid Volume | | | | Ratio[1] | Based on Dry Weight Mycelium | | Ratio[1] | beta-Carotene Av., mg/100 ml. |
|---|---|---|---|---|---|---|---|---|
| Percent | (+) Strain | Percent | (−) Strain | | Percent | Percent | | |
| 2 | 2456 | 2 | A-9159 | 4.0:1.0 | .061 | .0184 | 2.3:1.0 | 61 |
| 7 | 2456 | 3 | A-9159 | 2.3:1.0 | .053 | .0276 | 1.9:1.0 | 52 |
| 5 | 2456 | 5 | A-9159 | 1.0:1.0 | .038 | .0461 | 1.0:1.2 | 60 |
| 3 | 2456 | 7 | A-9159 | 1.0:2.3 | .023 | .0645 | 1.0:2.8 | 76 |
| 2 | 2456 | 8 | A-9159 | 1.0:4.0 | .015 | .0736 | 1.0:4.9 | 79 |
| 8 | 2456 | 2 | 1719B | 4.0:1.0 | .061 | .0284 | 2.1:1.0 | 46 |
| 7 | 2456 | 3 | 1719B | 2.8:1.0 | .053 | .0426 | 1.2:1.0 | 57 |
| 5 | 2456 | 5 | 1719B | 1.0:1.0 | .038 | .0710 | 1.0:1.9 | 29 |
| 3 | 2456 | 7 | 1719B | 1.0:2.3 | .023 | .0993 | 1.0:4.3 | 21 |
| 2 | 2456 | 8 | 1719B | 1.0:4.0 | .015 | .113 | 1.0:7.5 | 24 |

[1] Ratio calculated by reducing or expanding the proportion of the inoculum mixture to where the organism added in the least amount equals unity.

The foregoing description and data amply demonstrate the advantages of the present invention with respect to achieving significant improvement in beta-carotene production by the fermentation process.

I claim:

1. A process for producing beta-carotene which includes the step of cultivating unequal proportions of plus and minus mating type strains of beta-carotene producing organisms of the genus Choanephora in a nutrient medium containing a carbohydrate source and a nitrogen source, the proportion of one mating type strain of organism to the opposite mating type strain of organism being greater than about 1.2:1 on a dry weight basis.

2. A process for producing beta-carotene which includes the step of cultivating unequal proportions of plus and minus mating type strains of beta-carotene producing organisms of the genus Choanephora in a nutrient medium containing a carbohydrate source and a nitrogen source, the proportion of one mating type strain of organism to the opposite mating type strain of organism being within the range from about 1.2:1 to about 20:1 on a dry weight basis.

3. A process for producing beta-carotene which includes the step of cultivating in a nutrient medium containing a carbohydrate source and a nitrogen source *Choanephora trispora* strain NRRL A–9159 and *Choanephora trispora* strain NRRL A–9216 wherein the ratio of strain NRRL A–9159 to strain NRRL A–9216 is greater than about 1.2:1 on a dry weight basis.

4. The process of claim 3 wherein the ratio of strain NRRL A–9159 to NRRL A–9216 is about 2.6:1 on a dry weight basis.

5. A process for producing beta-carotene which includes the step of cultivating in a nutrient medium containing a carbohydrate source and a nitrogen source *Choanephora trispora* strain NRRL 2457 and *Choanephora trispora* strain NRRL A–9216 wherein the ratio of strain NRRL 2457 to strain NRRL A–9216 is greater than about 1.2:1 on a dry weight basis.

6. The process of claim 5 wherein the ratio of strain NRRL 2457 to NRRL A–9216 is about 3.4:1 on a dry weight basis.

7. A process for producing beta-carotene which includes the step of cultivating in a nutrient medium containing a carbohydrate source and a nitrogen source *Choanephora trispora* strain NRRL 1348 and *Choanephora trispora* strain NRRL A–9159 wherein the ratio of strain NRRL 1348 to strain NRRL A–9159 is greater than about 1.2:1 on a dry weight basis.

8. The process of claim 7 wherein the ratio of strain NRRL 1348 to NRRL A–9159 is about 6.9:1 on a dry weight basis.

9. A process for producing beta-carotene which includes the step of cultivating in a nutrient medium containing a carbohydrate source and a nitrogen source *Choanephora trispora* strain NRRL A–9159 and *Choanephora trispora* strain NRRL 2456 wherein the ratio of strain NRRL A–9159 to strain NRRL 2456 is greater than about 1.2:1 on a dry weight basis.

10. The process of claim 9 wherein the ratio of strain NRRL A–9159 to NRRL 2456 is about 4.9:1 on a dry weight basis.

11. A process for producing beta-carotene which includes the step of cultivating in a nutrient medium containing a carbohydrate source and a nitrogen source *Choanephora trispora* strain NRRL 2456 and *Choanephora trispora* strain NRRL 1719B wherein the ratio of strain NRRL 2456 to strain NRRL 1719B is about 1.2:1 on a dry weight basis.

References Cited in the file of this patent

UNITED STATES PATENTS 3,001,912     Miescher _____ Sept. 26, 1961

UNITED STATES PATENT OFFICE
CERTIFICATE OF CORRECTION

Patent No. 3,128,236

April 7, 1964

James E. Zajic

It is hereby certified that error appears in the above numbered patent requiring correction and that the said Letters Patent should read as corrected below.

Column 3, line 24, for "comprising" read -- comparing --; column 5, line 20, for "shows" read -- show --; column 6, Table IV, fifth column, line 4 thereof, for ".0264." read -- .0264 --; same column 6, Table V, first column, line 1 thereof, for "2" read -- 8 --; same Table V, fifth column, line 7 thereof, for "2.8:1.0" read -- 2.3:1.0 --.

Signed and sealed this 28th day of July 1964.

(SEAL)

Attest:

ESTON G. JOHNSON
Attesting Officer

EDWARD J. BRENNER
Commissioner of Patents